J. BAUDOT.
ROTARY INTERNAL COMBUSTION ENGINE.
APPLICATION FILED APR. 18, 1916.

1,248,441.

Patented Dec. 4, 1917.
8 SHEETS—SHEET 2.

Fig. 2

Joseph Baudot
Inventor
by Laurence Langner
Attorney

Joseph Baudot, Inventor

J. BAUDOT.
ROTARY INTERNAL COMBUSTION ENGINE.
APPLICATION FILED APR. 18, 1916.

1,248,441.

Patented Dec. 4, 1917.
8 SHEETS—SHEET 6.

Joseph Baudot
Inventor
by Laurence Langner
Attorney

Fig. 11

UNITED STATES PATENT OFFICE.

JOSEPH BAUDOT, OF TOURCOING, FRANCE.

ROTARY INTERNAL-COMBUSTION ENGINE.

1,248,441.  Specification of Letters Patent.  Patented Dec. 4, 1917.

Application filed April 18, 1916. Serial No. 91,932.

*To all whom it may concern:*

Be it known that I, JOSEPH BAUDOT, a citizen of the French Republic, and residing at 62 Rue d'Anvers, Tourcoing, Nord, France, have invented certain new and useful Improvements in Rotary Internal-Combustion Engines, of which the following is a specification.

This invention relates to rotary engines and in particular to the class of rotary internal combustion engines wherein a rotary annular chamber is divided up into compartments with pistons working therein, these pistons being controlled so that each goes through a complete 4-stroke cycle. The principal object of the invention is to provide a rotary internal combustion engine of this type having the pistons interconnected and in turn connected to the fixed point acting as a stationary crank in such a manner that the pistons are positively caused to move in the required manner in their compartments or curved cylinders so as to carry out the movements of the 4-stroke cycle precisely and without any play or variation.

One form of construction of a rotary engine according to the present invention is shown in the accompanying drawings wherein.

Figure 1:
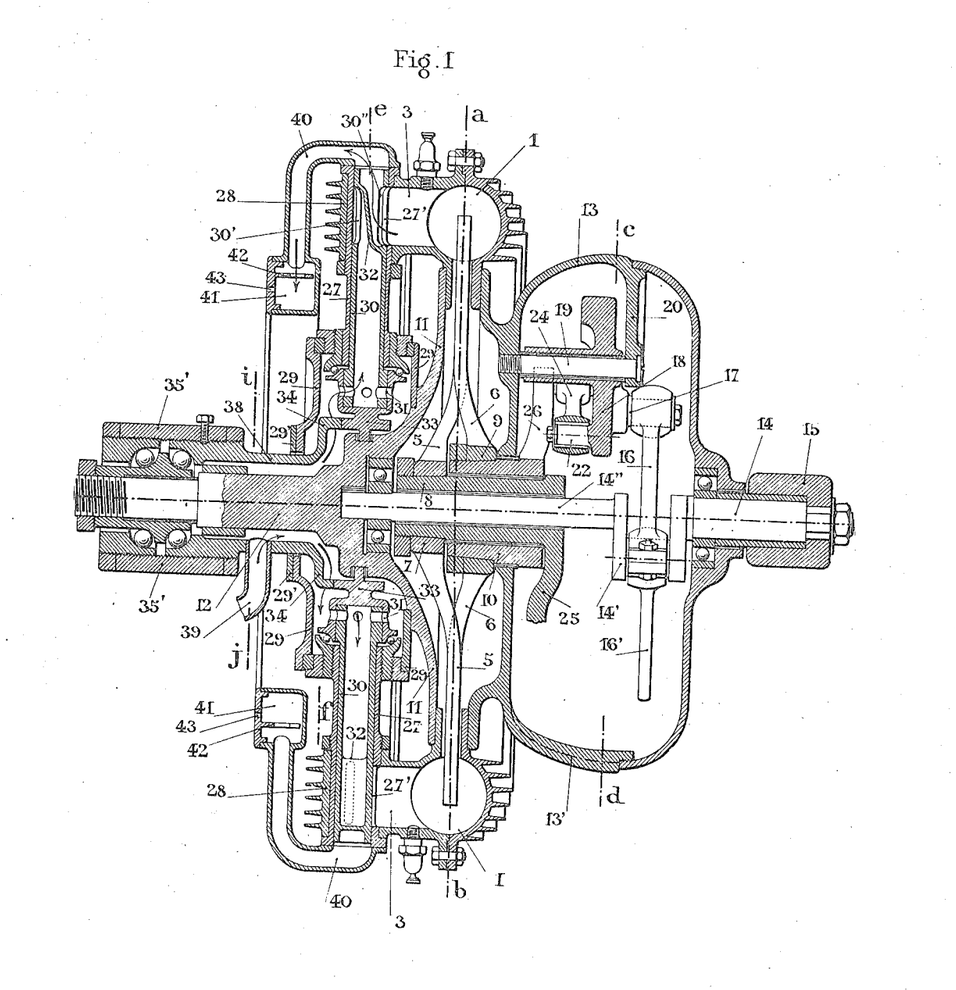
Figure 1 shows a vertical longitudinal section through the shaft of the engine.
Figure 2:
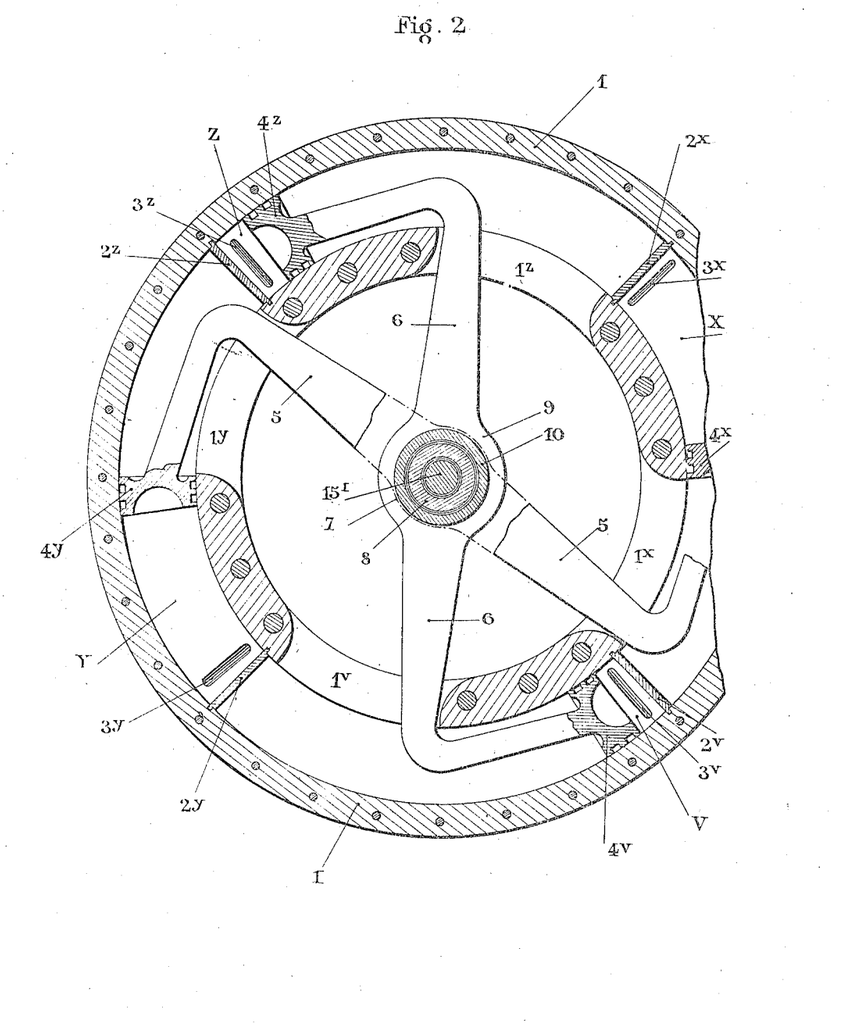
Fig. 2 shows a vertical transverse section on the line $a-b$ of Fig. 1, that is to say through the annular chambers or curved cylinders wherein the pistons move.

The rotary engine shown in the drawings has, like all other engines of the same class, an annular chamber 1, Figs. 1 and 2, sub-divided for example into four equal parts by means of partition walls $2^v$, $2^x$, $2^y$, and $2^z$, rigidly fixed in the annular chamber and thus forming four compartments or curved cylinders V, X, Y and Z, having orifices $3^v$, $3^x$, $3^y$ and $3^z$ serving for the admission of the combustible mixture and the exhaust of the burnt gases.

In the curved cylinders work pistons $4^v$, $4^x$, $4^y$ and $4^z$ whose piston rods or arms are bent as shown at 5—5 and 6—6 so as to connect the pistons together oppositely in pairs, the said arms passing through slots $1^x$, $1^y$, and $1^v$ $1^z$ in the inner face of the annular chamber 1. The double arm 5—5 is formed with a hub 7 for the purpose of securing it to a hollow shaft or sleeve 8 which turns around the central axis. The double arm 6—6 in turn is formed with a hub 9 by means of which it is fixed to a hollow shaft or sleeve 10 concentric with the sleeve 8.

On one side of the annular member 1 is bolted a plate 11 extending at its center into or forming part of a shaft 12 concentric with the sleeves 8 and 10, and forming the driving shaft of the engine. On the other side of the member 1 is bolted a gear case 13 formed in two parts secured detachably the one to the other for convenience in assembling.

Figure 3:
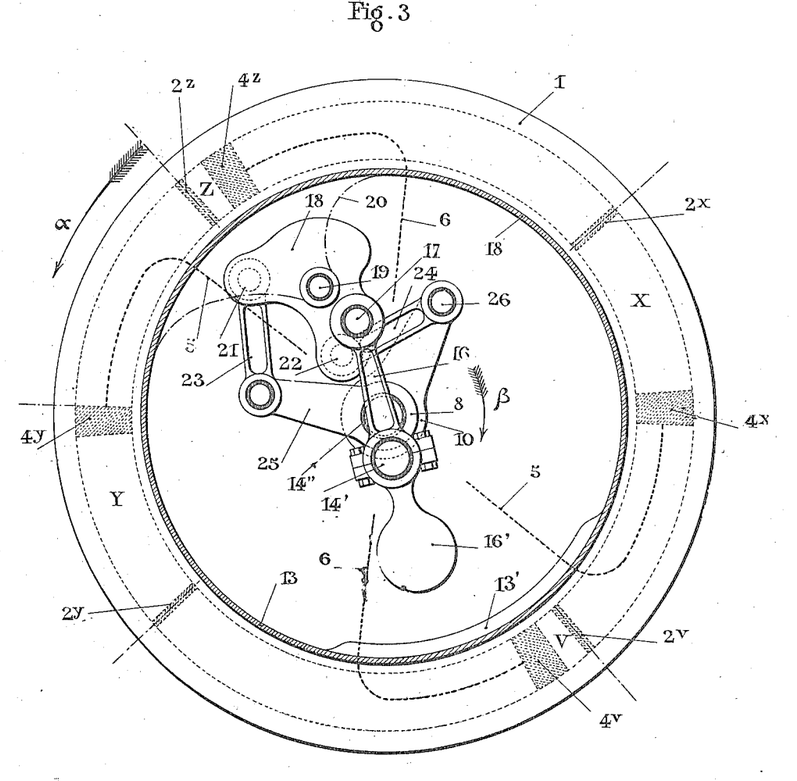
Fig. 3 shows another transverse section taken on the line $c-d$ of Fig. 1 and showing particularly the connecting mechanism between the pistons.

The gear case 13, Figs. 1 and 3 rotates with the annular member 1 turning around a fixed shaft 14 in line with the engine shaft 12, the shaft 14 being rigidly fixed in an end piece 15 mounted in any suitable way and forming the fixed member which acts as the point of application of the force rotating the engine. The shaft 14 inside the casing 13 is formed with a crank 14' and is then extended at 14'' so as to pass through the sleeve 8 and to rest at its end in a recess formed at the center of the plate 11; this plate and the sleeve 8 thus turn around the extension 14″ of the fixed shaft 14.

The crank 14′ is connected as shown in Figs. 1 and 3 by a balanced connecting rod 16—16′ to a pivot pin 17 mounted on an oscillating balancing member or rocker 18 which is capable of turning about a pivot 19 fixed on the one hand to the gear case 13, and on the other hand in a bracket 20 projecting inwardly therefrom. The rocker 18 is perfectly balanced and is provided with two pivot pins 21 and 22 connecting the rocker by links 23 and 24 to arms 25 and 26 projecting respectively from the concentric sleeves 8 and 10 which in turn are connected to the arms 5—5 and 6—6, and to the pistons $4^x$, $4^y$, and the pistons $4^y$, $4^z$ of the engine. The mass of the rocker 18 and of a part of the links 23 and 24 is balanced in the gear case 13 at a suitable point by a thickening of the same as at 13′ or in any other convenient manner.

The fixed crank 14′, the connecting rod 16—16′, the rocker 18, the links 23, 24, the arms 25, 26 and the sleeves 8 and 10 together constitute the connecting mechanism between the sets of pistons, and between these pistons and the fixed point of application of power 15 for the engine. The method of action of this arrangement is hereinafter more fully described.

Figure 8:
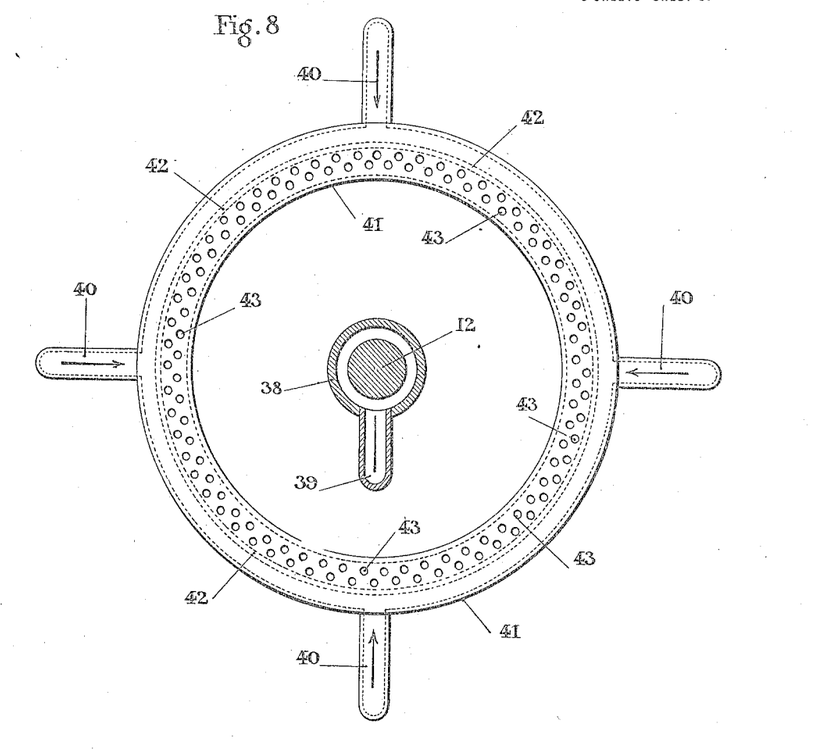
Fig. 8 is a section taken on the line $i-j$ of Fig. 1 showing the inlet for the combustible mixture and at the same time the annular rotating exhaust chamber for the burnt gases.

The compartments V, X, Y, Z of the annular chamber 1 communicate respectively by ports $3^v$, $3^x$, $3^y$, and $3^z$, with the casings 27 of valves 30 arranged radially (Figs. 1 and 4) with respect to the shaft 12. The fixed casing 27 of each valve has an aperture 27′ communicating with the port 3 (or rather $3^v$, $3^x$, $3^y$, $3^z$) of the corresponding cylinder. Each casing 27 is supported on the one hand in a socket 28 formed in one wall of the annular chamber 1 (Figs. 1, 4 and 5) and on the other hand in a small casing 29 from which each of the valve casings extends outwardly. The casing 29 is secured to the plate 11 of the engine shaft 12 on the one hand, and on the other hand it is provided with a gland 29′ (Fig. 1) surrounding a sleeve 38 referred to below, and serving to prevent the entry of any air around said sleeve. The casing 29 receives the combustible mixture from the sleeve 38 which in turn receives it through a pipe 39 passing into the same (Figs. 1 and 8). The combustible mixture passes from the casing 29 through the valve casings 27 to the respective curved cylinders of the engine, as is indicated by the arrows in Figs. 1 and 4.

Figure 4:
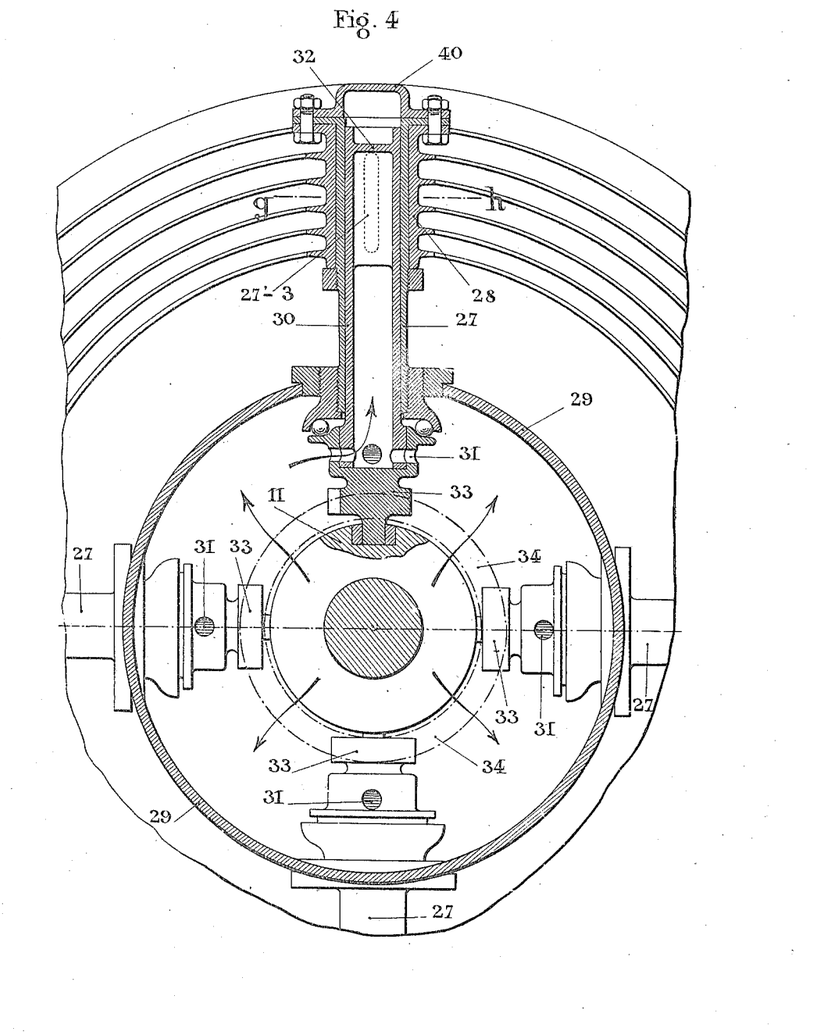
Fig. 4 shows a partial transverse section on a larger scale taken on the line $e-f$ of Fig. 1, and showing particularly the valve mechanism.
Figure 5:
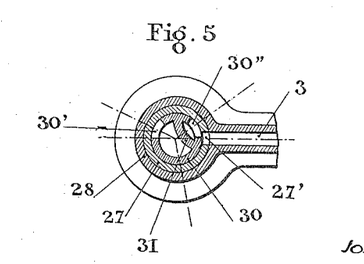
Fig. 5 shows to the same scale a section on the line $g-h$ of Fig. 4.
Figure 6:
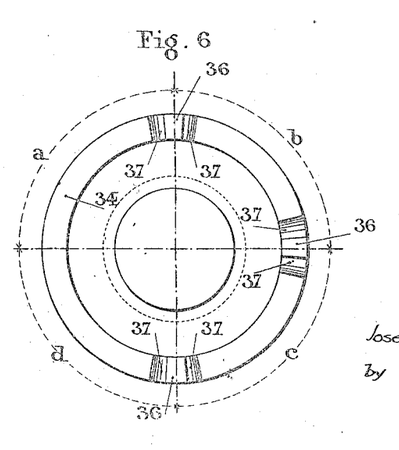
Fig. 6 is a detail view in side elevation of the stationary valve-operating member.

The tubular valve 30 inside each valve casing 27 works with as little friction as possible therein and is supported on ball bearings as shown in Figs. 1 and 4; the end of each valve 30 inside the casing 29 may conveniently be formed with holes 31 through which the mixture enters the valve; at the other end of each valve is a diaphragm 32, the end of the valve on one side thereof being slotted at 30′ and on the other side at 30″ so that the diaphragm separates the two slots of each valve. It is to be noted that the slots 30′, 30″ are not diametrically opposite and that the diaphragm 32 leaves a greater space at the side at which lies the slot 30′ which serves for the admission of the gas, than is left at the side of the slot 30″ serving for the escape of the exhaust gases, while the slots 30′ and 30″ are substantially wider (Fig. 5) than the slot 27′ and the port 3 with which they coöperate.

The slot 30′ communicates with the interior of the revoluble valve 30 and permits of the admission of the mixture through the port 3 when the valve is turned so that the said slot registers with the slot 27′ of the valve casing. The slot 30″ communicates on the other hand with the space outside the end of the valve 30 and allows the burnt gases to escape through the same port 3 when the slot 30″ registers with the slot 27′.

The inner end of each valve 30 is provided with a head piece 33 (Figs. 1 and 4) arranged to coöperate for turning the valve with projections 36 on a flange 34 forming part of the fixed sleeve 38 before-mentioned; this sleeve is secured in the casing 35′ of a ball-bearing supporting the engine shaft 12. As the annular chamber 1 turns, the valves 30 carried around therewith are therefore turned by the engagement of their notched heads 33 with the projections of the stationary flange 34.

Figure 7:
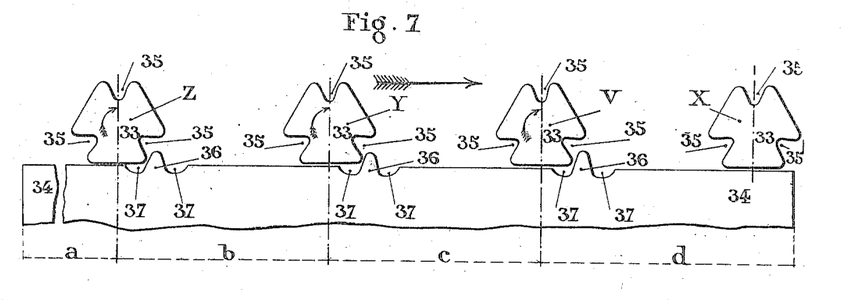
Fig. 7 shows a plan view of the same developed.

Each head 33 is of substantially triangular form as seen in Figs. 7, where the heads of all four valves are shown, the apex of each triangle being cut off and a notch 35 formed there to engage with the projections 36 of the flange 34. There are three such projections on the flange. This engagement which results from the turning of the chamber 1 with the valves, has the effect of turning each valve 30 through a third of a revolution in its casing 27, each time that its head passes one of the projections 36. It is to be noted that this rotation is allowed to take place owing to the provision of notches 37 at each side of each projection 36, while between each partial turning movement of a valve it is maintained in the position which it occupies after passing the last preceding projection 36 owing to the flat face of the head 33 passing along the flat end of the flange 34. The action will be obvious from Fig. 7 from which it will be seen that each valve is turned once for a single turn of the rotary chamber 1.

It is also to be noted that the spacing of the slots 30' and 30'' of each valve is in thirds of 360 degrees so that it corresponds to the turning in thirds of a complete revolution of the valve, while the flange 34 only has three teeth 36, although when developed as in Fig. 7, its circumference is divided into four spaces marked $a$, $b$, $c$, $d$. Consequently each head 33 when passing through the latter part of the space $d$ and the space $a$ will be maintained for a relatively long interval of time in the one position, as compared with the dwell which takes place in passing each of the spaces $b$ and $c$. The long dwell of the valve corresponds as will be seen later to its closed position, that is to say to the periods of compression and explosion of the mixture in the cylinder. The long dwell takes place successively for each of the compartments or cylinders of the engine.

The outer ends of the valves 30 communicate by their slots 30'' with bent pipes 40 (Figs. 1 and 8) secured to the outer ends of the sockets 28 of the casing 1.

These pipes lead into an annular chamber 41 turning therewith and therefore with the casing 1 of the engine. The annular chamber 41 serves as an exhaust chamber and silencer, and is sub-divided into two annular concentric compartments by a perforated partition wall 42 through which the exhaust gases must pass so as to be broken up before escaping into the atmosphere through holes 43 in the side wall of the inner annular compartment.

The following is a description of the action of the engine.

In the position of Figs. 2 and 3 the cylinder V is beginning to draw in the combustible mixture, the cylinder X is beginning the compression stroke, the cylinder Z is beginning the explosion stroke and the cylinder Y is beginning to exhaust.

Figure 9:
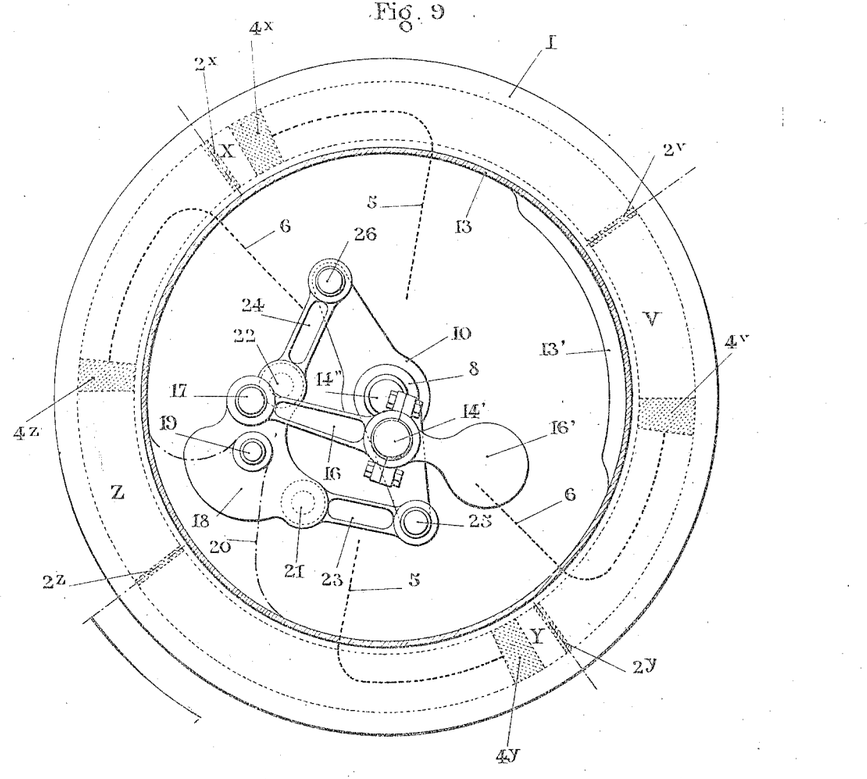
Figs. 9, 10 and 11 are corresponding figures to Fig. 3, showing the same parts in successive positions, and intended to facilitate the explanation of the action of these parts; the four figures show the successive positions of the parts at the beginning of each of the four periods of a 4-stroke cycle.

When the explosion takes place, for example in cylinder Z, the force of the expanding gases acts at the same time in opposite directions on the partition wall $2^z$ and on the piston $4^z$ of this cylinder. The partition wall carries around with it in the direction of the arrow $\alpha$, Fig. 3, the casing 1 which is the moving member of the engine, and which in turn carries with it the gear case 13 and the engine shaft 12; the piston on the other hand serves as the reacting member tending through its arm 6 to turn the sleeve 10 in the direction of the arrow $\beta$. The sleeve 10 in turn acting through the arm 26 and the link 24 tends to turn the rocker 18 around its pivot 19, the pivot 19 turning with the gear case 13 and engine casing 1, but this rocker can only turn in the manner allowed by the balanced link 16—16' connecting the pin 17 on the rocker to the crank 14'. As this crank is fixed in position the consequence is that the rocker 18 can only turn by forcing around the gear case 13 by means of the pivot 19 in the direction of rotation of the engine (arrow $\alpha$). The rocker turns then in a counter-clockwise direction so that the pin 21 moves downwardly, while the pin 22 moves upwardly with respect to the pivot 19, this latter of course moving in a circle around the center of the shaft 14''; the link 23 forces around the arm 25 faster than the engine casing 1 is turning, the arm 25 being connected to the double arm 5—5 of the pistons $4^x$ and $4^y$. These pistons are therefore forced up toward the partition walls $2^x$ and $2^y$ as seen in Fig. 9, so expelling exhaust gases from the cylinder Y which is open to exhaust during this stroke, and compressing the mixture in cylinder X. During the same interval the cylinder V draws in fresh mixture.

Figure 10:
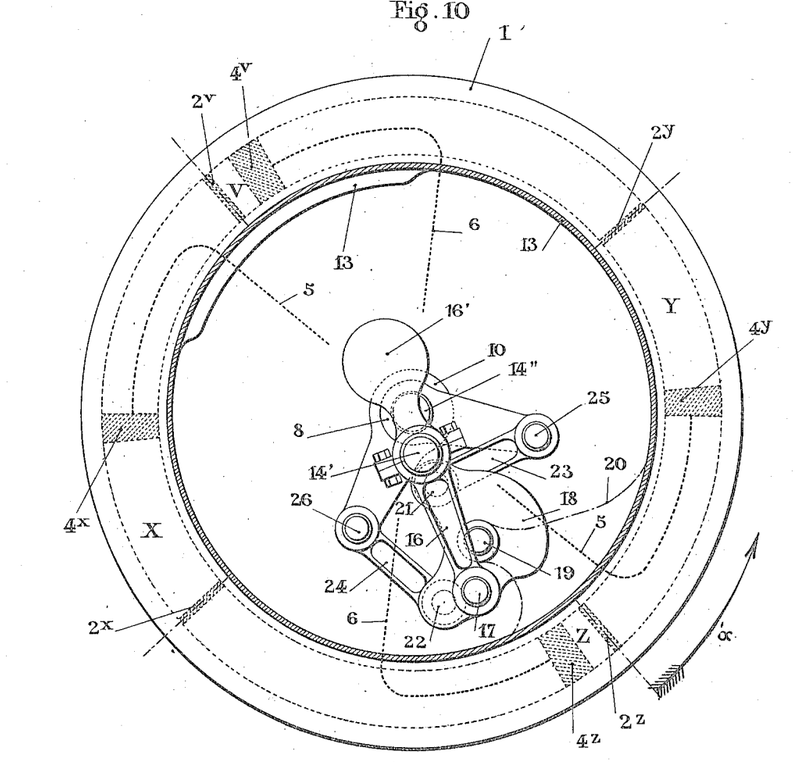

The cylinders V, X, Y and Z reach thus respectively the periods of compression, explosion, suction and exhaust, and the sequence of operations which is described for cylinder Z will be the same for cylinder X, while the connecting members are passing from the position of Fig. 9 to that of Fig. 10.

Figure 11:
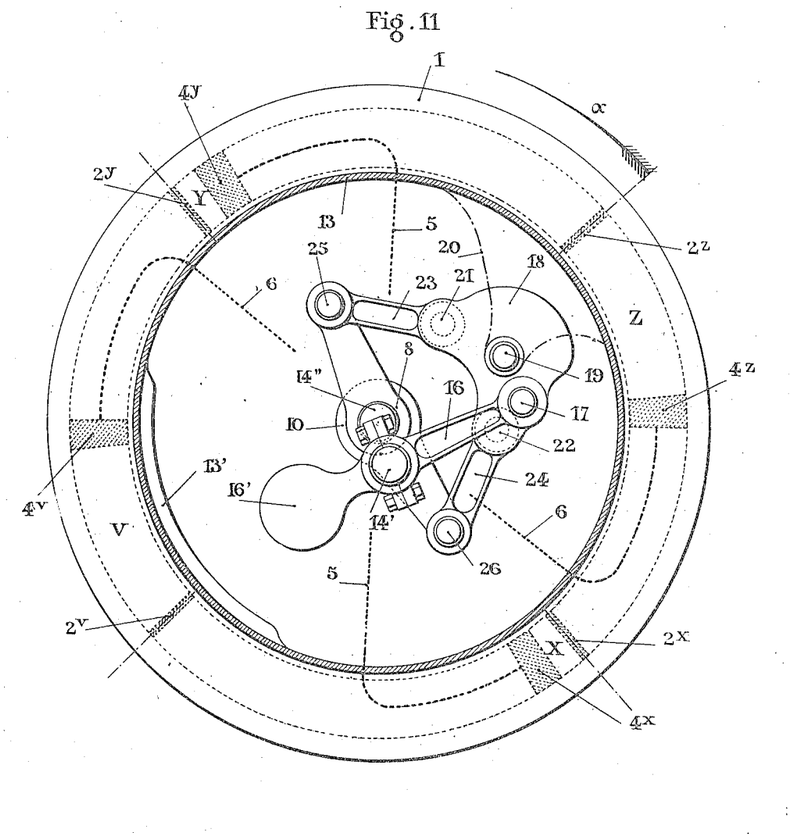

The cylinders V, X, Y and Z will thus respectively come to the periods of explosion, exhaust, compression and suction, and the actions described for the cylinders Z and X will be reproduced for the cylinder V, while the connecting members pass from the position of Fig. 10 to that of Fig. 11.

The cylinders V, X, Y and Z will pass then respectively through the periods of exhaust, suction, explosion and compression. The explosion will take place then in the cylinder Y, and under its action the rotary casing will turn in the direction of the arrow $\alpha$ while the connecting members of the mechanism will be returned to the position of Fig. 3.

The engine will thus have made one complete turn, and each of the four cylinders will have passed successively through the four periods of the cycle. It is to be noted that the pistons acting as the reaction members not only do not oppose resistance to the turning movement of the engine casing or acting member, but contribute to a large extent to this movement because the links controlling the movement of the pistons and connected to the rocker 18 have to pass over the dead center position. It will be understood that the valves 30 and the operating parts of the valve mechanism will only offer a very slight resistance to the turning of the engine on account of their arrangement and mode of action.

The valves 30 are placed with respect to their operating flange 34 so that (in Fig. 3) the valve of cylinder V has its slot 30' registering with the port 3 of the said cylinder.

Figure 12:
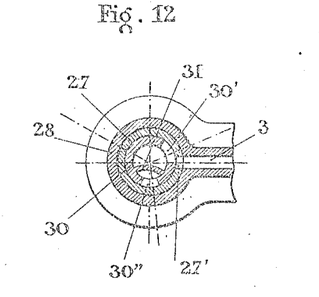
Figs. 12 and 13 are corresponding views to Fig. 5 showing the valve in two other positions.
Figure 13:
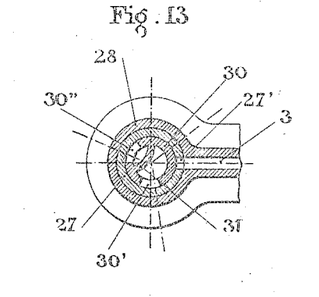

Fig. 12, so as to allow of a fresh charge being drawn in; at the same time the valve of cylinder X blocks completely the port 3 of the said cylinder, as seen in Fig. 13 and at the bottom in Fig. 1, as the cylinder X is beginning the compression period; at the same time the valve of cylinder Y has its slot 30″ registering with its port 3, as seen at the top of Fig. 1, in order to allow of exhaust from said cylinder Y; and finally at the same time the valve of cylinder Z is in the position closing its port 3, because the said cylinder is making the explosion stroke at this period.

The triangular heads 33 of the valves 30, under these conditions, travel over the face of the flange 34, as the engine turns, in the manner which will be seen from the developed diagram, Fig. 7. It will be observed that at the moment indicated the heads 33 corresponding to the cylinders Z, Y and V are about to cause their valves to turn through a third of a revolution in order to bring these cylinders respectively to the periods of exhaust, suction and compression, while the head 33 of the valve of cylinder X as it moves forward, will hold this valve in the same position as is necessary while the cylinder X passes through the explosion stroke. The same actions are reproduced successively for the respective valves at each quarter turn of the engine, while the cylinders and their valve casings move around with respect to the stationary flange 34.

The means for securing the ignition of the compressed charge at the right moment is not indicated, but any convenient ignition means may be employed so as to ignite the charges in the cylinders when they come respectively into the working position.

The precision with which the valves operate to control the admission and exhaust to and from the cylinders will be noted, and the accuracy with which the turning movements of the valves correspond to the required changes in the cycle of operations. The flange 34 is easily secured on the ball bearing 35, and its mounting and adjustment involves no difficulty. Moreover, the large area of the slots 30′ and 30″ makes possible a considerable variation in the adjustment. Further, it is noted that by the arrangement adopted the valve members are effectively cooled by the passage of the fresh gases therethrough, these gases from the small casing 29 passing through the valves 30 up to the ports 3, cooling the major part of the surface of the valves and ports.

On the other hand, the burnt gases are allowed to escape easily and rapidly through the bent pipes 40 to the annular exhaust chamber 41 as the engine turns. As the exhaust gases escape from the silencer through the perforations 43, they may be collected and their discharge directed by any suitable means.

It will be understood that for a rotary engine having a different number of cylinders, either greater or less than four, a corresponding number of valves would be provided. Further, it will be obvious that for engines working on a two-stroke cycle the number of valves would be the same and only the operating mechanism for the valves would be modified, for example by making the heads 33 four-cornered instead of three-cornered, and making the flange 34 with only two projections or teeth 36 instead of three, so that the valves 30 would only make a complete turn for two revolutions of the engine. Such a modification would be of particular use in an engine having its cylinders disposed radially instead of in the annular form described.

Having thus described my invention what I claim as new and desire to secure by Letters Patent is:—

1. A rotary internal combustion engine comprising a rotary casing with a plurality of cylinders therein, a plurality of pistons one in each cylinder, means controlling the inlet and exhaust of gases to and from said cylinders, a plurality of arms connecting the pistons together in sets, a fixed crank pin, a rocker pivoted on the rotary casing, a connecting rod from said rocker to the fixed crank pin, and link mechanism connecting the rocker to the arms aforesaid.

2. A rotary internal combustion engine comprising a rotary casing with a plurality of cylinders therein, a plurality of pistons one in each cylinder, means controlling the inlet and exhaust of gases to and from said cylinders, a plurality of arms connecting the pistons together in sets, a plurality of concentric sleeves on which the said arms are mounted, a fixed crank pin, a rocker pivoted on the rotary casing, a balanced connecting rod from said rocker to the fixed crank pin, and link mechanism connecting the sleeves to the rocker on opposite sides of the pivoting point thereof.

3. A rotary internal combustion engine comprising a rotary casing with a plurality of cylinders therein, a plurality of pistons one in each cylinder, means controlling the inlet and exhaust of gases to and from said cylinders, a plurality of concentric sleeves free to turn one on another, means connecting the pistons in pairs to said sleeves, arms on said sleeves, a rocker pivoted to the rotary casing, link mechanism between the rocker and said arms, a stationary crank pin, and a connecting rod between the rocker and the crank pin.

4. A rotary internal combustion engine comprising a rotary casing with a plurality of cylinders therein, a plurality of pistons one in each cylinder, means controlling the inlet and exhaust of gases to and from said cylinders, a plurality of concentric sleeves free to turn one on another, means connecting said pistons to the sleeves in pairs, a gear case secured to said rotary casing, arms on said sleeves and moving in said gear case, a stationary shaft mounted in said gear case and having the sleeves turning thereon, a crank on said shaft, a rocker pivoted in said gear case, links connecting the arms to the rocker on opposite sides of the pivot point thereof, and a connecting rod between the rocker and the crank.

JOSEPH BAUDOT.